United States Patent [19]

Eguchi et al.

[11] Patent Number: 5,048,627
[45] Date of Patent: Sep. 17, 1991

[54] FAIL-SAFE REAR WHEEL STEERING SYSTEM FOR VEHICLE

[75] Inventors: Takaaki Eguchi, Isehara; Norimasa Nakamura, Zama, both of Japan

[73] Assignee: Nissan Motor Co., Ltd., Yokohama, Japan

[21] Appl. No.: 375,629

[22] Filed: Jul. 5, 1989

[30] Foreign Application Priority Data

Jul. 5, 1988 [JP] Japan ................ 63-165932

[51] Int. Cl.$^5$ .................................. B62D 5/08
[52] U.S. Cl. ..................... 180/140; 280/91; 364/424.05
[58] Field of Search .............. 180/140, 141, 142; 364/424.05; 280/91

[56] References Cited

U.S. PATENT DOCUMENTS

| 4,657,102 | 4/1987 | Kanazawa | 180/140 |
| 4,687,214 | 8/1987 | Uno | 180/140 |
| 4,770,264 | 9/1988 | Wright et al. | 180/140 |

FOREIGN PATENT DOCUMENTS

| 334723 | 9/1989 | European Pat. Off. . |
| 2589419 | 5/1987 | France . |
| 59-128054 | 7/1984 | Japan . |
| 59-128055 | 7/1984 | Japan . |
| 61-85275 | 4/1986 | Japan . |
| 61-108066 | 5/1986 | Japan . |
| 61-108067 | 5/1986 | Japan . |
| 0131875 | 6/1987 | Japan | 180/140 |
| 0166162 | 7/1987 | Japan | 180/140 |
| 0168762 | 7/1987 | Japan | 180/140 |
| 0199568 | 9/1987 | Japan | 180/140 |
| 2170457 | 8/1986 | United Kingdom . |

*Primary Examiner*—Charles A. Marmor
*Assistant Examiner*—Anne Marie Boehler
*Attorney, Agent, or Firm*—Foley & Lardner

[57] ABSTRACT

A fail-safe vehicle rear wheel steering control system includes a hydraulic actuator for steering the rear wheels, an electromagnetic control valve for controlling fluid pressure of the actuator in accordance with a control signal, and a controller for controlling the rear wheel steer angle by producing the control signal. This fail-safe control system is characterized by a fail-safe cutoff valve disposed between the actuator and the control valve, and a fail-safe controller independent from the main controller. When the main controller or the control valve fails, the fail-safe controller brings the fail-safe valve to a closed position, and therefore, the fail-safe valve prevents an abrupt change of the rear wheel steer angle, and instead gradually allows a decrease of the rear wheel steer angle to zero by allowing a gradual leakage of the oil under pressure from the actuator.

10 Claims, 5 Drawing Sheets

FAIL-SAFE REAR WHEEL STEERING SYSTEM FOR VEHICLE

BACKGROUND OF THE INVENTION

The present invention relates to a fail-safe system for a four wheel steering system of a vehicle.

There have been proposed various four wheel steering systems. Some recent examples are disclosed in commonly-assigned, copending U.S. patent applications: (i) U.S. Ser. No. 07/284,414; filed on Dec. 14, 1988 (corresponding to a European Patent Application No. 88 121 139.5), (ii) U.S. Ser. No. 07/305,023; filed on Feb. 2, 1989, now U.S. Pat. No. 4,934,474 (corresponding to a European Application No. 89 101 947.3), and (iii) U.S. Ser. No. 07/343,379; filed on Apr. 26, 1989 (corresponding to a European Application No. 89 107 570.7).

Many of the four wheel steering systems employ a hydraulic actuator for steering the rear wheels, an electromagnetic control valve for controlling an oil pressure supplied to the hydraulic actuator, and an electronic controller for controlling the control valve. In a four wheel steering system of such a type, however, a failure in an electrical circuit easily impairs the stability of the vehicle by causing an abrupt change in vehicle behavior, and arouses an unnatural feeling in the driver. For example, a failure in the electronic controller or a breakage of a solenoid of the electromagnetic control valve makes the electromagnetic valve inoperative, so that the oil pressure in the actuator is immediately reduced to zero. As a result, the rear wheels are abruptly returned to a straight ahead position by the action of a center spring of the actuator, and the behavior of the vehicle is changed abruptly.

SUMMARY OF THE INVENTION

It is therefore an object of the present invention to provide a fail-safe system which can ensure the stability and safety of a four wheel steering vehicle against various failures in the four wheel steering system.

According to the present invention, a rear wheel steering control system for a vehicle comprises a hydraulic actuator, a control valve, a main controller means and a fail-safe means. The actuator is arranged to receive a control fluid pressure and to vary a rear wheel steer angle of the vehicle in accordance with the control fluid pressure. The control valve is a valve for varying the control fluid pressure in accordance with a control signal. The main controller means is a means, such as an electronic controller, for controlling the rear wheel steer angle by producing the control signal. The fail-safe means is a means for varying the control fluid pressure gradually to a predetermined fail-safe value when the control system fails.

For example, these elements are arranged as schematically shown in FIG. 4. In this example, the fail-safe means comprises a fail-safe valve disposed between the control valve and the hydraulic actuator, and a fail-safe controller means for controlling the fail-safe valve. The fail-safe valve can open and close a control fluid pressure passage through which the control fluid pressure is supplied from the control valve to the hydraulic actuator. The fail-safe controller means brings the fail-safe valve to its closed position to close the control fluid pressure passage when a failure is detected in the control system. The fail-safe valve of this example has a means (as shown by a broken line in FIG. 4) for allowing the fluid under pressure to gradually leak out from the hydraulic actuator when the fail-safe valve is in the closed position. In this example, the main controller means and the fail-safe controller means are separated from each other, and each has its own power source.

DETAILED DESCRIPTION OF THE INVENTION

Figure 1:
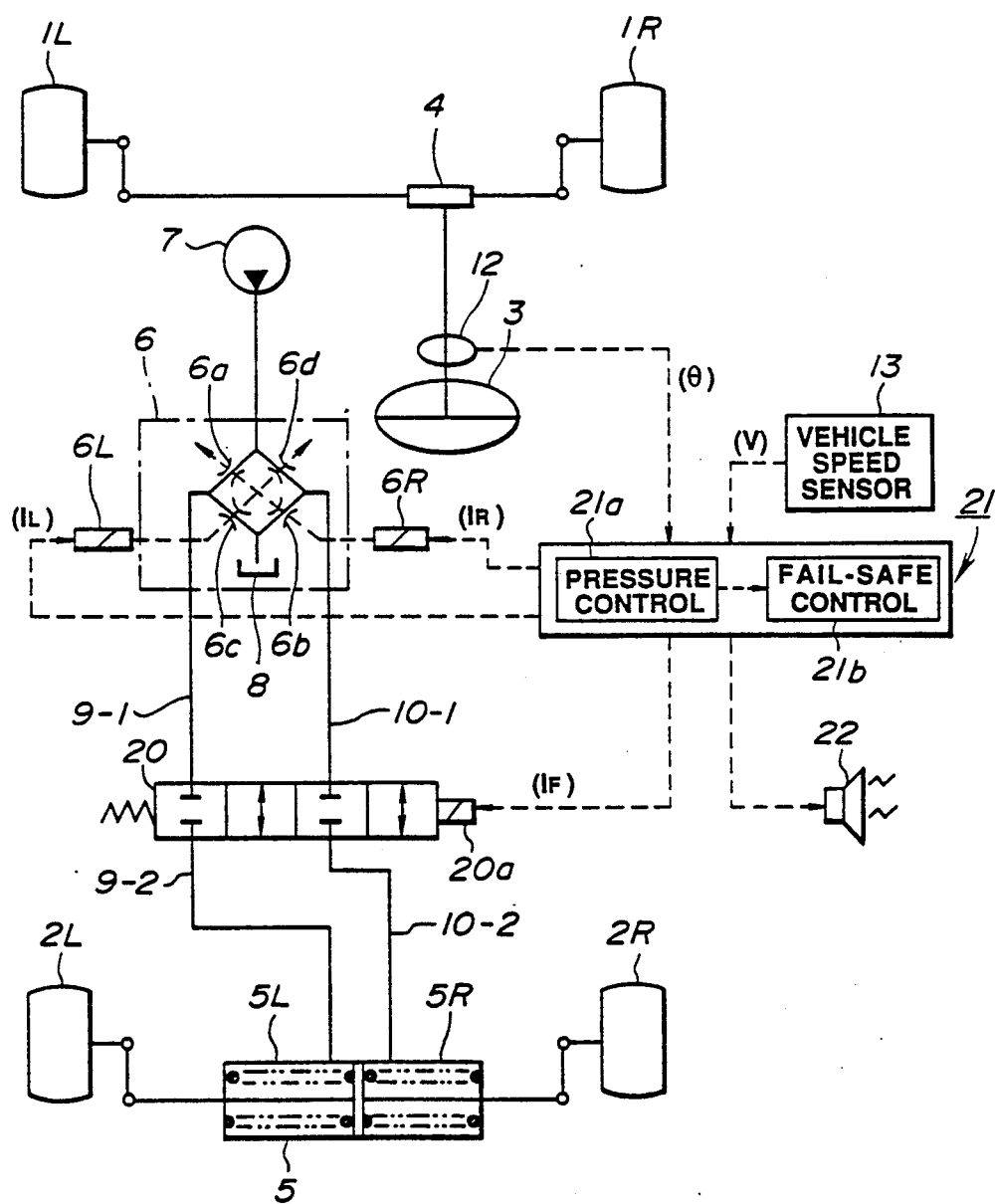
FIG. 1 is a schematic view of four wheel steering vehicle equipped with a fail-safe system according to one embodiment of the present invention.

FIG. 1 shows a vehicle equipped with a fail-safe system according to one embodiment of the present invention.

The vehicle shown in FIG. 1 has left and right front wheels 1L and 1R, left and right rear wheels 2L and 2R, and a steering wheel 3. The front wheels 1L and 1R are connected with the steering wheel 3 through a steering gear 4 in a conventional manner. There is further provided a rear wheel steering actuator 5 for steering the rear wheels 2L and 2R.

The rear wheel steering actuator 5 is a spring center type hydraulic actuator, and has left and right fluid pressure chamber 5L and 5R. When oil pressure is supplied to the right pressure chamber 5R, the actuator 5 steers the rear wheels 2L and 2R rightwards through an angle proportional to the oil pressure. When oil pressure is supplied to the left chamber 5L, the actuator 5 steers the rear wheels 2L and 2R leftwards through an angle proportional to the oil pressure.

A rear wheel steering control valve 6 of the electromagnetic proportional type is provided for controlling the oil pressures supplied to the left and right pressure chambers 5L and 5R of the actuator 5. The control valve 6 has four variable orifices 6a, 6b, 6c and 6d, which are connected in a bridge circuit, as shown in FIG. 1. Four junction points of the bridge circuit are connected, respectively, with a pump 7, a reservoir 8, and left and right oil passages 9(9-1 and 9-2) and 10(10-1 and 10-2) leading to the left and right pressure chambers 5L and 5R of the rear wheel steering actuator 5. The control valve 6 further includes left and right solenoids 6L and 6R. When both solenoids 6L and 6R are off, the orifices 6a and 6b, and the orifices 6c and 6d are all fully opened, so that both pressure chambers 5L and 5R are held at a non-pressurized state. When one of the solenoids 6L and 6R is energized by an exciting current $I_L$ or $I_R$, a pair of the variable orifices 6c and 6d or 6a and 6b are closed to a reduced opening degree corresponding to the exciting current, so that the oil pressure corresponding to $I_L$ or $I_R$ is supplied to the pressure chamber 5L or 5R of the actuator 5.

A controller 21 is connected with the solenoids 6L and 6R of the control valve 6, and designed to control the rear wheel steer angle of the rear wheels 2L and 2R by controlling the exciting currents $I_L$ and $I_R$. A group of sensors are connected with the controller 21. In this embodiment, there are provided a steering angle sensor 12 for sensing a steering wheel angle $\theta$ of the steering wheel 3, and a vehicle speed sensor 13 for sensing a vehicle speed V of the vehicle. By varying the currents $I_L$ and $I_R$, the controller 21 can steer the rear wheels 2L and 2R in the same phase direction as the front wheel steering direction, and in an opposite phase direction to the front wheel steering direction, through a desired angle in accordance with the steering angle $\theta$ and the vehicle speed V.

A fail-safe cutoff valve 20 is provided between the rear wheel steering control valve 6 and the rear wheel steering hydraulic actuator 5. The left oil passage 9 connecting the left pressure chamber 5L of the actuator with the control valve 6 is divided by the fail-safe valve 20 into a first section 9-1 and a second section 9-2. Similarly, the right oil passage 10 is divided into a first section 10-1 and a second section 10-2, as shown in FIG. 1. The fail-safe valve 20 is of a normally closed type. When a solenoid 20a of the fail-safe valve 20 is not energized, the fail-safe valve 20 is held in a closed position in which the fail-safe valve 20 shuts off the first and second sections 9-1 and 9-2 of the left passage from each other, and simultaneously shuts off the first and second sections 10-1 and 10-2 of the right oil passage. When the solenoid 20a is energized, the fail-safe valve 20 is put in an open position in which the first and second sections of each oil passage 9 or 10 are fluidly connected together. The fail-safe valve 20 has a means for allowing the oil under pressure to gradually leak out of the actuator 6 when the fail-safe valve 20 is in the closed position. This means for causing leakage is composed of a pair of restricted clearances or passages which connect, respectively, when the fail-safe valve 20 is in the closed position, the second section 9-2 to the first section 9-1 of the left passage 9, and the second section 10-2 to the first section 10-1 of the right passage 9, and/or a restricted clearance or passage which connects the second sections 9-2 and 10-2 of the left and right passages 9 and 10 when the fail-safe valve 20 is in the closed position.

Figure 4:
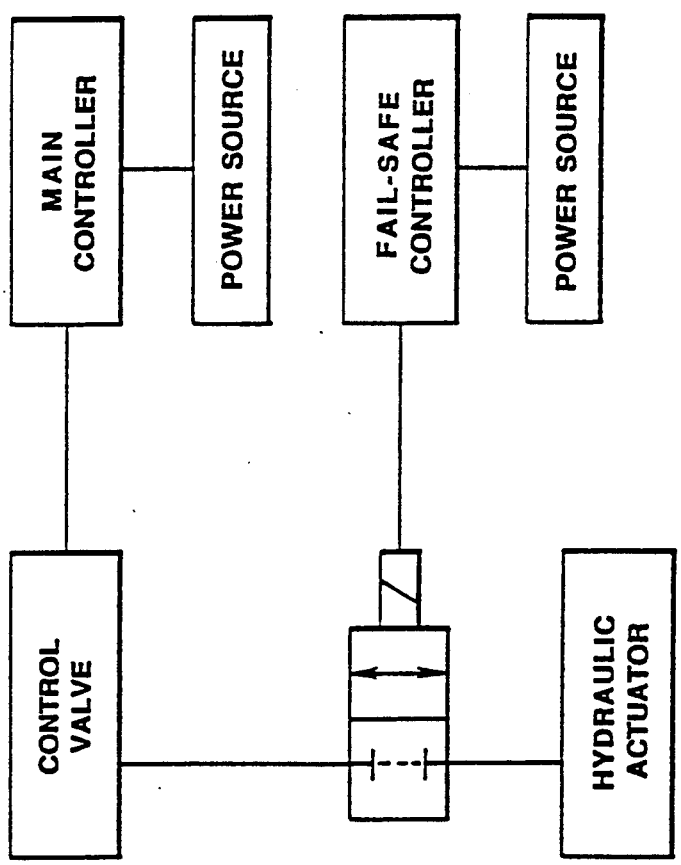
FIG. 4 is a block diagram schematically showing one example of a basic arrangement of the present invention.

The controller 21 of this embodiment has an oil pressure control section 21a (serving as the main controller means shown in FIG. 4) and a fail-safe control section 21b (serving as the fail-safe controller means shown in FIG. 4), which are two separate entities having two separate power sources, respectively. The controller 21 performs the function of a watchdog timer for detecting a possible malfunction, such as runaway of the pressure control section 21a. Upon receipt of a failure detection signal from the oil pressure control section 21a, the fail-safe control section 21b cuts off the exciting current $I_F$ of the solenoid 20a of the fail-safe valve 20, and actuates an alarm device 22. The failure signal is produced when an abnormality is detected such as a malfunction of the controller resulting from influence of an external noise, or a failure in the ROM, RAM, CPU or some other component of the controller, an abnormal decrease in the electric power supply of the pressure control section 21a, an abnormality in the sensor signals (of the steering angle sensor 12 and the vehicle speed sensor 13), and an abnormality of the control valve 6 due to a breakage of a wire of the solenoid 6L or 6R. The control system of this embodiment is arranged to detect the wire breakage of the solenoid by checking whether a dither signal (100 Hz) is present or absent.

Figure 2:
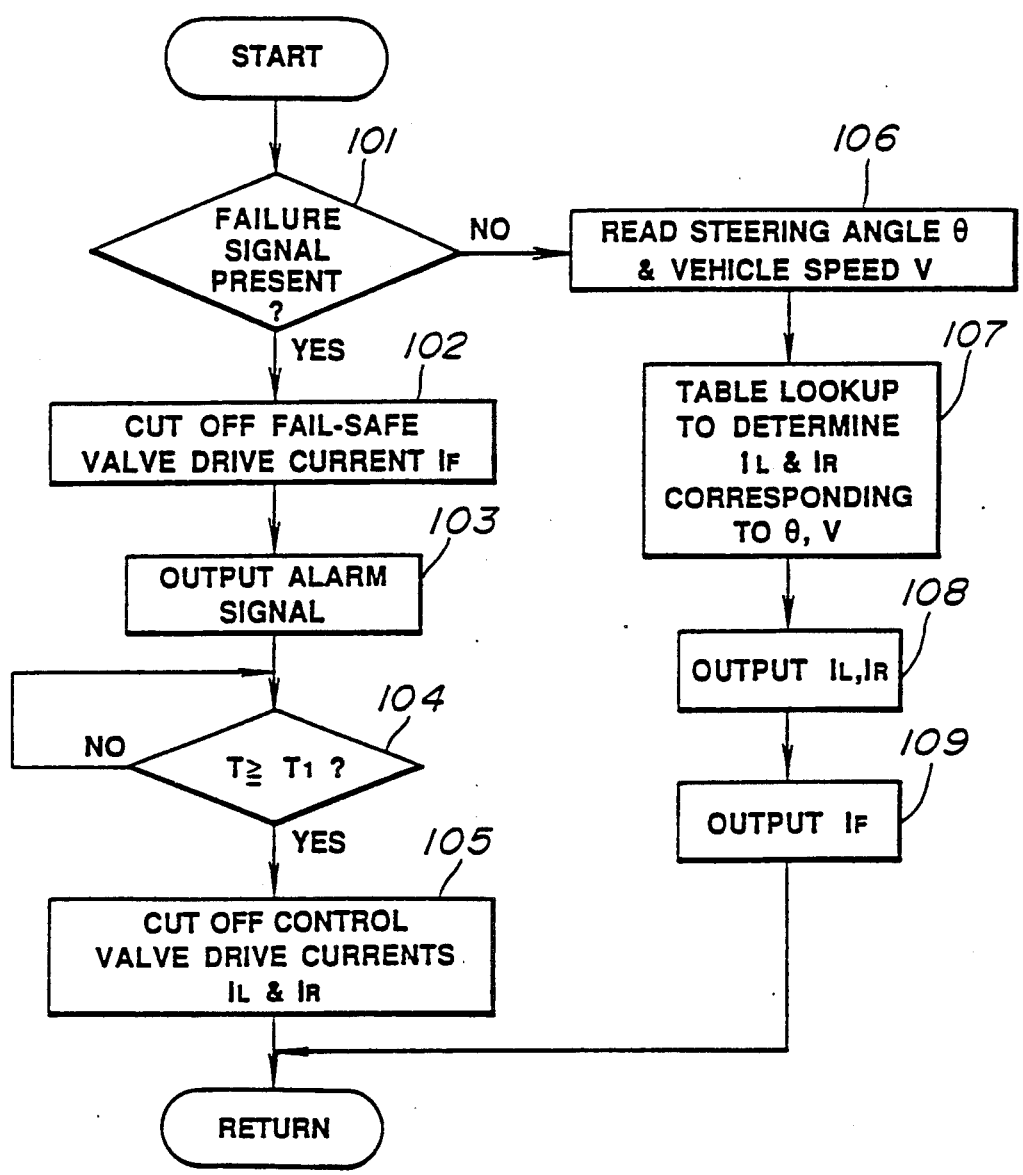
FIG. 2 is a flowchart showing a control procedure performed by a controller 21 shown in FIG. 1.

The controller 21 of this embodiment periodically performs a control process shown in FIG. 2 in every operating cycle.

At a first step 101, the fail-safe section 21b of the controller 21 determines whether the failure signal is present or not. In this embodiment, this failure signal is produced by the oil pressure control section 21a if at least one of the above-mentioned abnormal conditions is detected. The fail-safe control section 21b detects the failure signal.

When the failure signal is present, and accordingly the answer of the decision step 101 is affirmative, then fail-safe section 21b of the controller 21 proceeds from the step 101 to steps 102 and 103. At the step 102, the fail-safe control section 21b of the controller 21 turns off the exciting current $I_F$ for the solenoid 20a of the fail-safe valve 20. At the step 103, the fail-safe control section 21b delivers an alarm signal to the alarm device 22 to switch on a warning buzzer or a warning light.

At a step 104, the fail-safe control section 21b determines when an elapsed time T from the execution of the step 103 becomes equals to a predetermined time length $T_1$ (for example, 150 msec). When the elapsed time T is equal to or greater than the predetermined length $T_1$, then the fail-safe control section 21b turns off the exciting currents $I_L$ and $I_R$ for the solenoids 6L and 6R of the control valve 6 at a step 105.

The steps 101-105 are all performed by the fail-safe control section 21b of the controller 21. At the step 102, the fail-safe control section 21b causes the fail-safe cutoff valve 20 to shut off the left oil passage between the first and second sections 9-1 and 9-2, and to shut off the right oil passage between the first and second sections 10-1 and 10-2. Therefore, the left and right pressure chambers 5L and 5R of the rear wheel steering actuator 5 are shut off from the control valve 6, and accordingly the rear wheel steer angle is fixed temporarily at the current value existing at the instant at which the pressure chambers 5L and 5R are shut off. Shortly after the shutoff of the fail-safe valve 20 (about 150 msec after), the fail-safe control section 21b forcedly cuts off the exciting currents $I_L$ and $I_R$ for the solenoids 6L and 6R of the control valve 6. In some cases, however, the currents $I_L$ and $I_R$ have been already cut off because of a power failure (decrease) of the oil pressure control section 21a or a disconnection of the solenoids 6L and 6R or some other abnormality. Thereafter, the residual oil under pressure in the chambers 5L and 5R gradually leaks out through the restricted clearances or passages in the fail-safe valve 20 from the second sections 9-2 and 10-2 of the oil passages to the first sections 9-1 and 10-2, respectively, and/or through the restricted clearance or passage from ore of the second sections 9-2 and 10-2 to the other, and the pressures finally decrease to zero at an end of a predetermined time length (about 6-10 sec, in this example). During this time, the rear wheels 2L and 2R are gradually returned to the neutral (straight ahead) position, and the rear wheel steer angle is gradually reduced to zero. In this way, this fail-safe control system can ensure the stability of the vehicle by preventing an abrupt change in the vehicle behavior when the rear wheel steering system fails. Furthermore, this fail-safe system can improve the vehicle stability against side wind, and "tuck-in". The fail-safe valve 20 of this embodiment performs its fail-safe action even when a wire of the solenoid 20a breaks.

When the rear wheel steering system is normal, and accordingly the failure section signal is absent, the controller 21 proceeds from, the step 101 to a normal control procedure consisting of steps 106–109. At the step 106, the pressure control section 21a of the controller 21 reads the steering angle θ sensed by the steering angle sensor 12, and the vehicle speed V sensed by the vehicle speed sensor 13. At the step 107, the control section 21a determines the exciting currents $I_L$ and $I_R$ in accordance with the steering angle and the vehicle speed by the table lookup. At the step 108, the control section 21a delivers the currents $I_L$ and $I_R$ to the solenoids 6L and 6R of the control valve 6. Thereafter, the control section 21a delivers the exciting current $I_F$ to the solenoid 20a of the fail-safe valve 20. Therefore, the fail-safe valve 20 is put in the open position, and permits the normal rear wheel steer angle control. In this way, the pressure control section 21a of the controller 21 controls the rear wheel steer angle. In the present invention, it is possible to employ any of the various known relationships of the rear wheel steer angle with respect to the steering angle and vehicle speed. For example, the rear wheel steer angle is controlled to be proportional to a linear combination of the steering angle multiplied by a first coefficient dependent on the vehicle speed, and a time rate of change of the steering angle multiplied by a second coefficient dependent on the vehicle speed. In this embodiment, the steps 106–109 are performed by the pressure control section 21a.

FIGS. 3A, 3B, 3C and 3D show characteristics of a vehicle equipped with the fail-safe system of this embodiment. These graphs show the behavior of the vehicle, computed by using a nonlinear 8 degree-of-freedom vehicle model, provided that the energizing current of the electromagnetic control valve 6 is reduced to zero by a failure from a fully steered state of the rear wheels while the vehicle is in a turn of 0.6G and the vehicle speed is 120 km/h. In each graph, a solid line shows the characteristic of the vehicle equipped with the fail-safe system of this embodiment, and a broken line shows a characteristic of a vehicle which does not have such a fail-safe system. In the vehicle having no fail-safe system, the speed at which the rear wheel steer angle decreases to zero is approximately equal to the restoring speed of the spring of the rear wheel steering actuator 5, and the resistance of the oil is negligible. Therefore, the rear wheel steer angle decreases rapidly from an instant $t_1$ of occurrence of the failure until the steer angle reaches zero at an instant $t_2$. In contrast to this, the fail-safe system of the embodiment closes the fail-safe valve 20 at an instant $t_4$ before the instant $t_2$. Therefore, the rear wheel steer angle decreases gradually, as shown by the solid line, from the instant $t_4$, and finally reaches zero at an instant $t_3$. The instants $t_1$ and $t_4$ correspond to the steps 101 and 102, respectively.

Figure 3A:
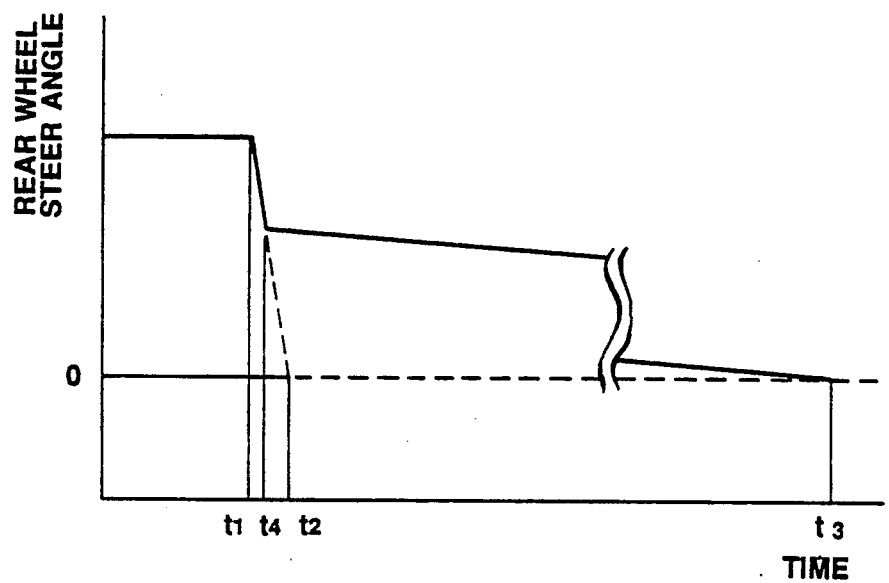
FIGS. 3A, 3B, 3C and 3D are graphs showing characteristics of rear wheel steer angle, yaw rate, lateral acceleration and side slip angle with respect to time, which are obtained by the fail-safe system shown in FIGS. 1 and 2.
Figure 3B:
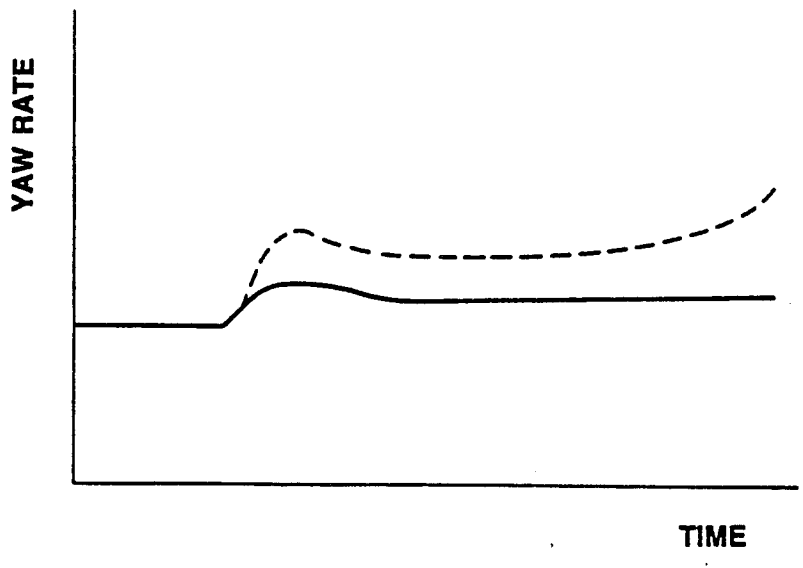
Figure 3:
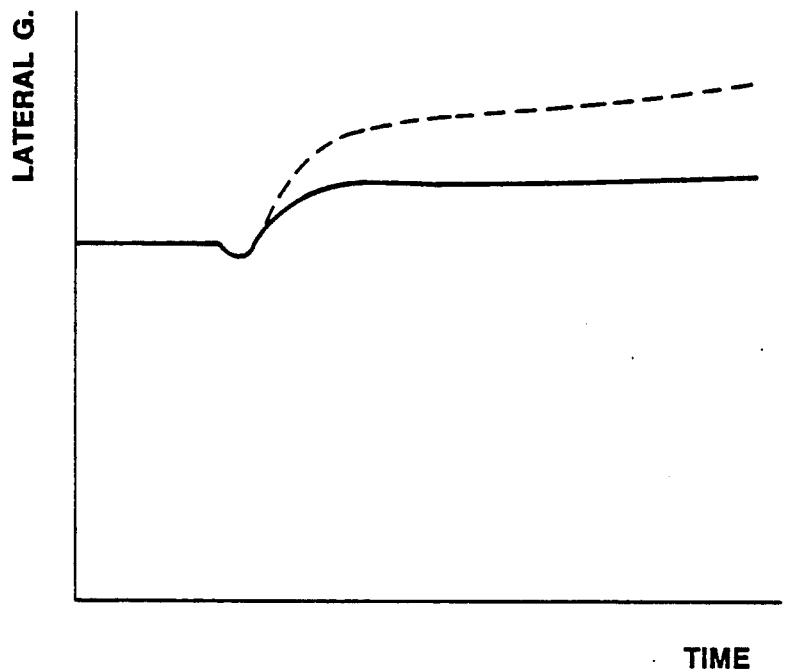
Figure 3:
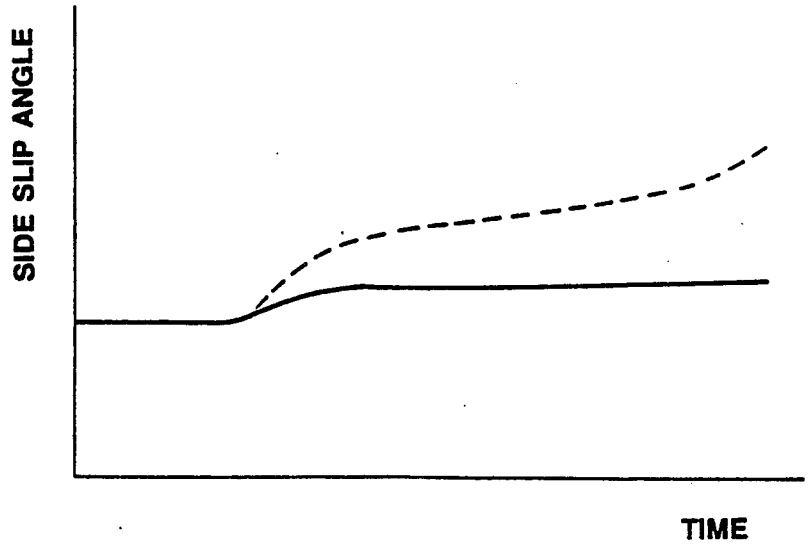

As a result, the fail-safe system of the embodiment can prevent abrupt change in the yaw rate, lateral acceleration and side slip angle, as shown by the solid lines in FIGS. 3B, 3C and 3D.

What is claimed is:

1. A rear wheel steering control system for a vehicle, comprising:
    a hydraulic actuator for receiving control fluid pressure and varying a rear wheel steer angle in accordance with said control fluid pressure,
    a control valve for varying said control fluid pressure in accordance with a control signal,
    main controller means for producing said control signal to control said rear wheel steer angle, and
    fail-safe means for varying said control fluid pressure gradually to a predetermined fail-safe value when said control system fails, said fail-safe means comprising a fail-safe valve, comprising a solenoid, disposed between said control valve and said hydraulic actuator for closing and opening a control fluid pressure passage connecting said control valve and said actuator, and fail-safe controller means for placing said fail-safe valve in a closed position to close said control fluid pressure passage in response to a failure detection signal,
    wherein said control valve is an electromagnetic valve, and said fail-safe controller means includes means which, upon receipt of said failure detection signal, first places said fail-safe valve in said closed position, and then cuts off an electric current supplied to said electromagnetic valve.

2. A rear wheel steering control system for a vehicle, comprising:
    a hydraulic actuator for receiving control fluid pressure and varying a rear wheel steer angle of said vehicle in accordance with said control fluid pressure;
    an electromagnetic control valve for varying said control fluid pressure;
    main controller means for controlling said electromagnetic control valve to control said rear wheel steer angle;
    a fail-safe valve disposed between said electromagnetic control valve and said hydraulic actuator, said fail-safe valve having an open position and a closed position; and
    fail-safe controller means for opening and closing said fail-safe valve, said fail-safe controller means including means which, when said main controller means becomes unable to control said electromagnetic control valve, cuts off a supply of said fluid pressure to said actuator by closing said fail-safe valve, and then cuts off a supply of exciting current to said electromagnetic control valve.

3. A control system according to claim 2 wherein said fail-safe valve includes means for allowing fluid under said fluid pressure to gradually leak out from said hydraulic actuator when said fail-safe valve is in a closed position.

4. A control system according to claim 3 wherein said fail-safe controller means is separate from said main controller means.

5. A control system according to claim 4, wherein said fail-safe controller means is connected with a power source which is separate from a power source of said main controller means.

6. A control system according to claim 2 wherein said fail-safe valve includes a first solenoid and is held in said closed position when said solenoid is not energized.

7. A control system according to claim 6 wherein upon receipt of said failure detection signal, said fail-safe controller means first deenergizes said solenoid of said fail-safe valve to place said fail-safe valve in said closed position, and then varies said control signal to a neutral level to allow said rear wheel steer angle to decrease to zero.

8. A control system according to claim 6, wherein said electromagnetic control valve is actuated by a second solenoid, and said fail-safe controller means includes means which, upon receipt of said failure detection signal, deenergizes said first solenoid of said fail-safe valve immediately, and holds said second solenoid of said control valve energized for a predetermined limited time length.

9. A control system according to claim 1, wherein said fail-safe controller means includes means which, upon receipt of a failure detection signal, first places said fail-safe valve in said closed position, and then cuts off said current supplied to said electromagnetic control valve.

10. A rear wheel steering control system for a vehicle, comprising:
a hydraulic actuator for receiving control fluid pressure and varying a rear wheel steer angle in accordance with said control fluid pressure,
a control valve for varying said control fluid pressure in accordance with a control signal,
main controller means for producing said control signal to control said rear wheel steer angle, and
fail-safe means for varying said control fluid pressure gradually to a predetermined fail-safe value when said control system fails, said fail-safe means comprising a fail-safe valve, comprising a first solenoid, disposed between said control valve and said hydraulic actuator for closing and opening a control fluid pressure passage connecting said control valve and said actuator, and fail-safe controller means for placing said fail-safe valve in a closed position to close said control fluid pressure passage in response to a failure detection signal,
wherein said fail-safe valve is held in said closed position when said first solenoid is not energized, and
wherein said control valve is an electromagnetic valve actuated by a second solenoid, and said fail-safe controller means includes means which, upon receipt of said failure detection signal, deenergizes said first solenoid of said fail-safe valve immediately, and holds said second solenoid of said control valve energized for a predetermined limited time length.

* * * * *